United States Patent
Chiu

(10) Patent No.: US 8,934,946 B2
(45) Date of Patent: Jan. 13, 2015

(54) MOBILE POWER SUPPLY DEVICE WITH EXPANDING FUNCTION

(71) Applicant: Li-Kuo Chiu, Taipei (TW)

(72) Inventor: Li-Kuo Chiu, Taipei (TW)

( * ) Notice: Subject to any disclaimer, the term of this patent is extended or adjusted under 35 U.S.C. 154(b) by 67 days.

(21) Appl. No.: 13/941,914

(22) Filed: Jul. 15, 2013

(65) Prior Publication Data

US 2014/0274220 A1    Sep. 18, 2014

(30) Foreign Application Priority Data

Mar. 13, 2013   (TW) .............................. 102204603 U

(51) Int. Cl.
*H04M 19/00*       (2006.01)
(52) U.S. Cl.
CPC ..................................... *H04M 19/00* (2013.01)
USPC .......................... 455/573; 455/343.1; 320/107
(58) Field of Classification Search
USPC ................ 455/550.1, 573, 574, 575.1, 343.1, 455/343.3; 320/107, 137, 138
See application file for complete search history.

(56) References Cited

U.S. PATENT DOCUMENTS

| 2013/0234649 A1* | 9/2013 | Sevier et al. | 320/107 |
| 2014/0184171 A1* | 7/2014 | Lee et al. | 320/138 |
| 2014/0285006 A1* | 9/2014 | Xu | 307/23 |

* cited by examiner

*Primary Examiner* — Thanh Le
(74) *Attorney, Agent, or Firm* — Bacon & Thomas, PLLC

(57) ABSTRACT

The present invention discloses a mobile power supply device. The mobile power supply device includes at least one expansion interface, at least one transmission interface, a charging control unit, a battery, and an expansion control unit. The transmission interface is used for electrically connecting to an electronic host device. The charging control unit is electrically connected to the transmission interface and to at least one external power supply. The battery is electrically connected to the charging control unit. The charging control unit is used for controlling the external power supply to charge the battery and for controlling the battery to charge the electronic host device. The expansion control unit is electrically connected to the expansion interface and the transmission interface; the expansion control unit communicates with the external device via the expansion interface and communicates with the electronic host device via the transmission interface.

11 Claims, 3 Drawing Sheets

MOBILE POWER SUPPLY DEVICE WITH EXPANDING FUNCTION

BACKGROUND OF THE INVENTION

1. Field of the Invention

The present invention relates to a mobile power supply device; more particularly, the present invention relates to a mobile power supply device with an expansion interface.

2. Description of the Related Art

As technology develops, a major trend in the development of electronic devices is portability. Many manufacturers conduct research and development on portable electronic products, and the most important portable electronic product in the current market is the smartphone.

Currently, the smartphone is limited in size, weight, and appearance; therefore, the smartphone cannot include too many expansion slots or interfaces. Generally, a smartphone usually has only two expansion interfaces, namely, a Subscriber Identity Module (SIM card) slot, and an external power supply input interface (such as a Micro Universal Serial Bus interface); therefore, the smartphone cannot connect to many additional external devices due to the different connection requirements.

In addition, most current users of the smartphone also use a mobile power supply device with the smartphone to charge the smartphone when the smartphone is out of electricity. However, currently, the mobile power supply device is used only as a standby power supply; the mobile power supply device does not include any other functions except charging. Since the mobile power supply device is increasingly popular and is becoming essential equipment for the smartphone user, the external connecting function of the electronic device should be expanded via the mobile power supply device to allow further variety in the application of the mobile power supply device.

SUMMARY OF THE INVENTION

It is an object of the present invention to provide a mobile power supply device with an expansion interface.

To achieve the abovementioned object of the present invention, the mobile power supply device of the present invention includes at least one expansion interface, at least one transmission interface, a charging control unit, a battery, and an expansion control unit. The transmission interface is used for electrically connecting to an electronic host device. The charging control unit is electrically connected to the transmission interface and at least one external power supply. The battery is electrically connected to the charging control unit. The charging control unit is used for controlling the external power supply to charge the battery and for controlling the battery to charge the electronic host device via the transmission interface. The expansion control unit is electrically connected to the expansion interface and the transmission interface; the expansion control unit communicates with the at least one external device via the expansion interface and with the electronic host device via the transmission interface such that the electronic host device communicates with the external device via the control of the expansion control unit.

According to one embodiment of the present invention, when the external device is electrically connected to the expansion interface, the charging control unit controls the battery to charge the external device via the expansion interface.

According to one embodiment of the present invention, when the external device is electrically connected to the expansion interface and the battery is out of the electricity, the electronic host device charges the external device via the expansion interface.

According to one embodiment of the present invention, the transmission interface of the present invention includes a physical transmission device and a wireless communication module. The physical transmission device is used for electrically connecting to the electronic host device, allowing the charging control unit to control the battery to charge the electronic host device via the physical transmission device; the mobile power supply device can communicate with the electronic host device via the physical transmission device or the wireless communication module.

According to one embodiment of the present invention, the physical transmission device of the present invention is a Micro Universal Serial Bus, and the wireless communication module is a Bluetooth communication module.

According to one embodiment of the present invention, the expansion interface of the present invention is a memory card slot, and the external device is a memory card.

According to one embodiment of the present invention, the expansion interface of the present invention is a subscriber identity identification module card slot, and the external device is a subscriber identity identification module card.

According to one embodiment of the present invention, the mobile power supply device of the present invention further includes a fingerprint sensor. The fingerprint sensor is electrically connected to the expansion interface.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENT

Figure 1:
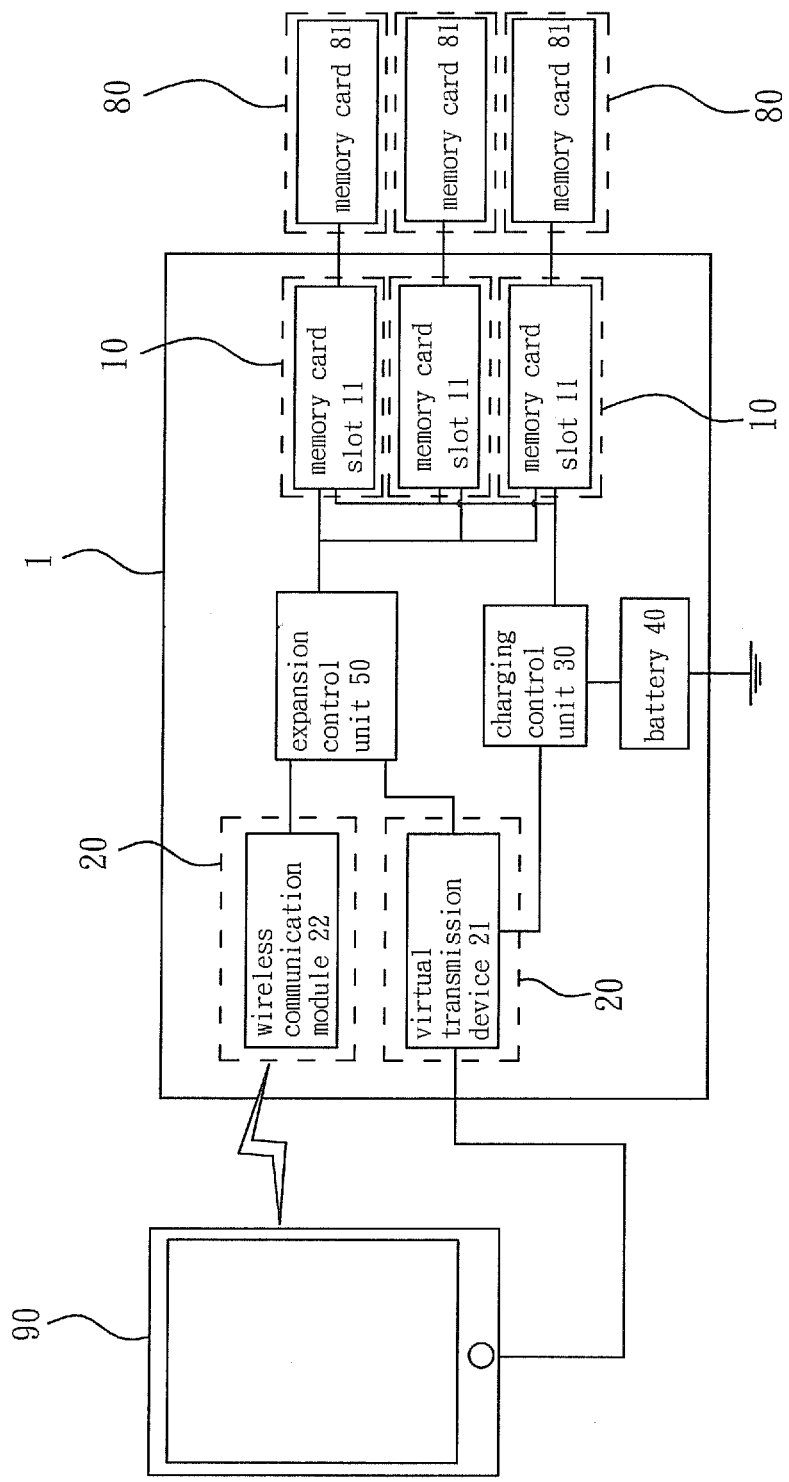
FIG. 1 illustrates a device structure drawing of the mobile power supply device of the first embodiment of the present invention.

Please refer to FIG. 1, which illustrates a device structure drawing of the mobile power supply device of the first embodiment of the present invention.

As shown in FIG. 1, the mobile power supply device 1 of the present invention is used for charging an electronic host device 90 and for allowing at least one external device 80 to communicate with the electronic host device 90 via the mobile power supply device 1. In one embodiment of the present invention, the electronic host device 90 is a smartphone, but the present invention is not limited to that design. In the first embodiment of the present invention, the mobile power supply device 1 of the present invention includes three expansion interfaces 10, two transmission interfaces 20, a charging control unit 30, a battery 40, and an expansion control unit 50.

The expansion interfaces 10 are compatible to the external device 80. As shown in FIG. 1, in the first embodiment of the present invention, the expansion interface 10 includes three memory card slots 21, and the external device 80 includes three memory cards 81 or three memory modules.

In the first embodiment of the present invention, the transmission interface 20 includes a physical transmission device 21 and a wireless communication module 22. The physical transmission device 21 is used for electrically connecting to the electronic host device 90. The wireless communication module 22 is used for allowing the mobile power supply device 1 to communicate with the electronic host device 90 via a wireless communication method. In one embodiment of the present invention, the physical transmission device 21 is a Micro Universal Serial Bus (Micro USB), and the wireless communication module 22 is a Bluetooth communication module, but the present invention is not limited to that design.

In the first embodiment of the present invention, the charging control unit 30 is electrically connected to the transmission interface 20 and an external power supply (not shown in the figure). The charging control unit 30 is used for controlling the external power supply to charge the battery 40, and for controlling the battery 40 to charge the electronic host device 90 via the transmission interface 20.

In the first embodiment of the present invention, the battery 40 is electrically connected to the charging control unit 30. When the physical transmission device 21 is electrically connected to the electronic host device 90, via the controlling of the charging control unit 30, the battery 40 can charge the electronic host device 90 via the physical transmission device 21. When the external device 80 is electrically connected to the expansion interface 10 and the battery 40 has electricity, then via the controlling of the charging control unit 30, the battery 40 can charge the external device 80 via the expansion interface 10; if the battery 40 is out of electricity, the electronic host device 90 can charge the external device 80 via the expansion interface 10.

In the first embodiment of the present invention, the expansion control unit 50 is electrically connected to the expansion interface 10 and the transmission interface 20. The expansion control unit 50 can communicate with the external device 80 via the expansion interface 10 and communicate with the electronic host device 90 via the transmission interface 20. In a specific application, because most the operating systems (such as the Windows operating system, Android operating system, or other standard operating systems) of the electronic host device 90 already have standard drivers, such as the mass storage device driver and the human interface device driver, then when the mobile power supply device 1 is electrically connected to the electronic host device 90 via the physical transmission device 21, the electronic host device 90 will load the corresponding driver; after the expansion control unit 50 of the mobile power supply device 1 is started by the driver, the expansion control unit 50 can communicate with the electronic host device 90. When the electronic host device 90 communicates with the expansion control unit 50 of the mobile power supply device 1, the user can use the electronic host device 90 to read the data in the memory card 11 or store the data from the electronic host device 90 to the memory card 11. Furthermore, in the first embodiment of the present invention, the data can also be transferred between the mobile power supply device and the electronic host device 90 via the Bluetooth communication module; when the electronic host device 90 communicates with the mobile power supply device 1 via the Bluetooth communication module, the user can use the electronic host device 90 to read the data in the memory card 11 or store the data from the electronic host device 90 in the memory card 11. Because the communication between two devices via the Bluetooth communication module is already disclosed in the prior art, there is no need for more description.

Figure 2:
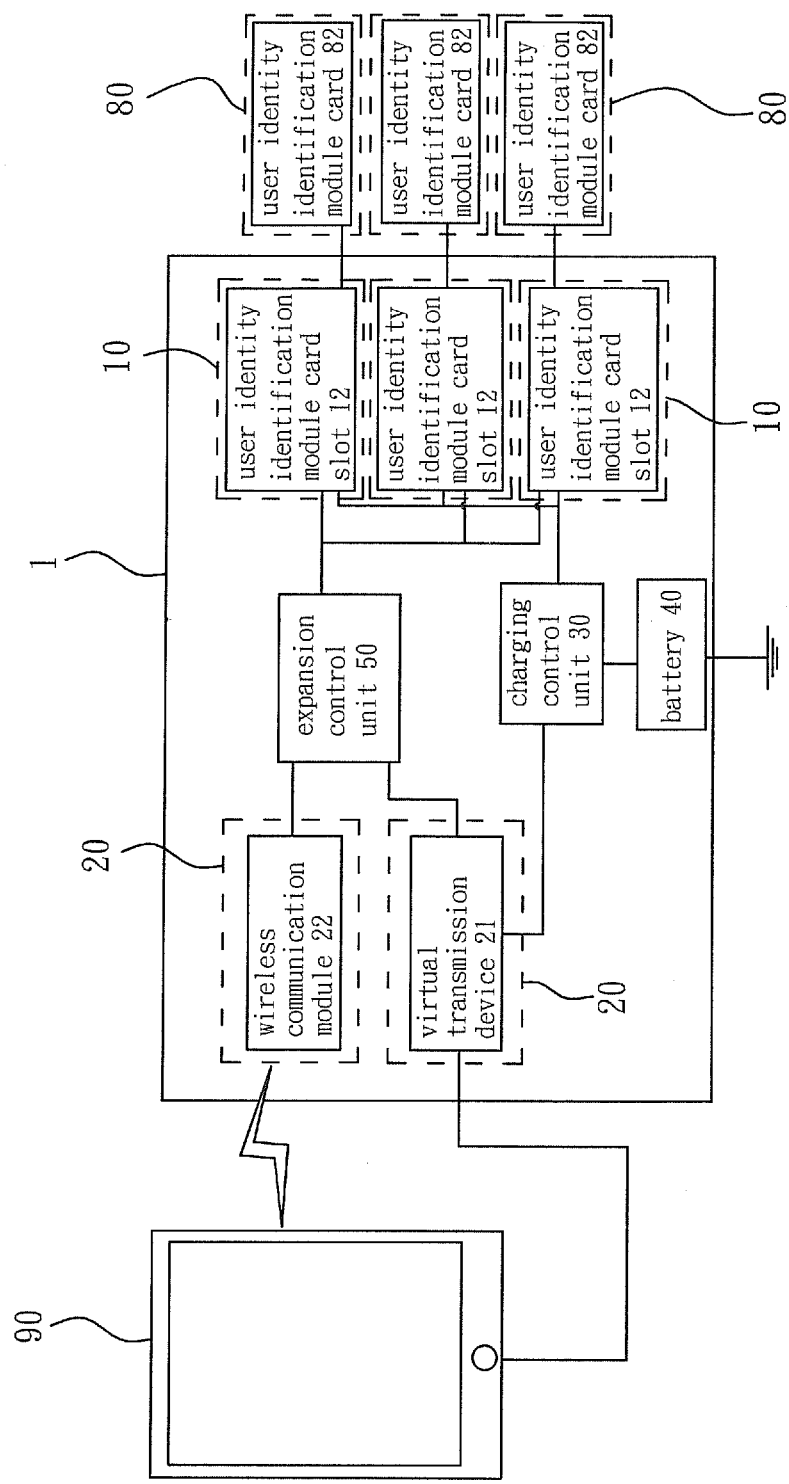
FIG. 2 illustrates a device structure drawing of the mobile power supply device of the second embodiment of the present invention.

Please refer to FIG. 2, which illustrates a device structure drawing of the mobile power supply device of the second embodiment of the present invention.

As shown in FIG. 2, in the second embodiment of the present invention, the difference between the first embodiment and the second embodiment is that the expansion interface 10 is a subscriber identity identification module card slot 12, and the external device 80 is a subscriber identity identification module card 82 (such as a Subscriber Identity Module, or SIM card). When the subscriber identity identification module card 82 is placed into the subscriber identity identification module card slot 12, the expansion control unit 50 can communicate with the subscriber identity identification module card 82 via the subscriber identity identification module card slot 12; if the user enters a password or other information to be certified via the electronic host device 90, the user can enter the communication service from the SIM card system service providers. Because the mobile power supply device 1 of the present invention includes a plurality of subscriber identity identification module card slots 12, then when the user places a plurality of subscriber identity identification module cards 82 and is granted access to the communication service, the electronic host device 90 can get a plurality of communication services from a plurality of SIM card system service providers and becomes a multi-card standby electronic host device 90.

Figure 3:
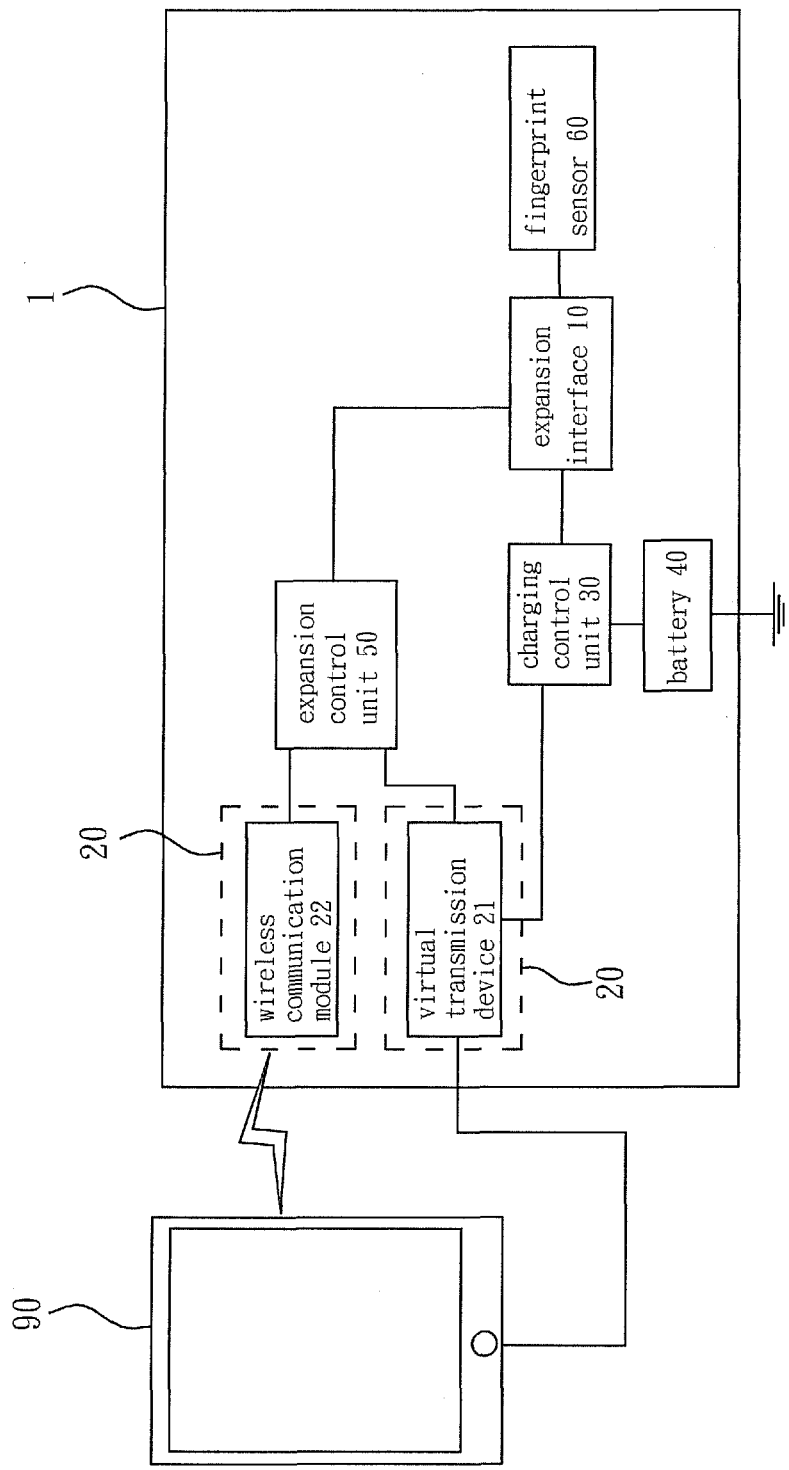
FIG. 3 illustrates a device structure drawing of the mobile power supply device of the third embodiment of the present invention.

Please refer to FIG. 3, which illustrates a device structure drawing of the mobile power supply device of the third embodiment of the present invention.

As shown in FIG. 3, in the third embodiment of the present invention, the difference between the third embodiment and the abovementioned embodiment is that the mobile power supply device 1 includes a fingerprint sensor 60. The fingerprint sensor 60 is electrically connected to the expansion interface 10. When the mobile power supply device 1 communicates with the electronic host device 90 (the method of communication of the third embodiment is same as that of the abovementioned embodiment), the user can transfer the fingerprint data to the electronic host device 90 via the fingerprint sensor 60 of the mobile power supply device 1. If the electronic host device 90 has a corresponding fingerprint recognition application, the electronic host device 90 can determine whether the sensed fingerprint corresponds to the fingerprint feature data in the electronic host device 90 to check whether the owner of the fingerprint has the right to use the electronic host device 90 and then proceed with the corresponding actions or transactions after authorization.

It must be noted that the afore-described implementations are only preferred embodiments of the present invention, and for simplification of the description, not all of the possible variants are recorded here. However, those skilled in the art will easily understand that the mobile power supply device 1 should include some conventional modules or elements in order to implement the present invention, and each module or element may be cancelled or modified case-by-case, and there may be other modules or elements between any two of the modules or elements. For example, the expansion interface 10 of the mobile power supply device 1 of the present invention is not limited to the device in the abovementioned embodiment; the expansion interface 10 can also be a Universal Serial Bus (USB), allowing the electronic host device 90 to connect to the input or output devices which use the Universal Serial Bus to communicate, such as a PC Peripheral/Human machine interface device such as a mouse, a keyboard, a printer, or a projector. The expansion interface 10 can also be any other standard communication interface. It is to be known that the plurality of expansion interfaces 10 of the mobile power supply device 1 of the present invention may be different to correspond to different devices; for example, the plurality of expansion interfaces 10 can be two subscriber identity identification module card slots 12, one fingerprint sensor 60, and a Universal Serial Bus.

According to the abovementioned description, the mobile power supply device 1 of the present invention includes a plurality of expansion interfaces 10. When the electronic host device 90 is electrically connected and communicating with the mobile power supply device 1, the mobile power supply device 1 can be used for charging the electronic host device 90 and for allowing the electronic host device 90 to connect to other devices via the mobile power supply device 1; therefore, the practicality of the mobile power supply device 1 is enhanced.

In summary, regardless of the function, the method and result of the present invention are shown to have technical characteristics different from the prior arts, and said method and result constitute a significant advance in the field. However, the aforementioned embodiments are just for illustration of the principle and the result of the present invention and should not be construed to limit the range of the present invention. It will be obvious to those skilled in the art that, based upon the content herein, changes and modifications may be made without departing from the spirit and scope of the present invention. Therefore, the appended claims are intended to encompass within their scope all such changes and modifications as are within the true spirit and scope of the exemplary embodiment(s) of the present invention.

What is claimed is:

1. A mobile power supply device, used for charging an electronic host device, allowing at least one external device to communicate with the electronic host device via the mobile power supply device, the mobile power supply device comprising:
    at least one expansion interface;
    at least one transmission interface, used for electrically connecting to the electronic host device;
    a charging control unit, electrically connected to the at least one transmission interface and an external power supply;
    a battery, electrically connected to the charging control unit, wherein the charging control unit is used for controlling the external power supply to charge the battery and for controlling the battery to charge the electronic host device via the at least one transmission interface; and
    an expansion control unit, electrically connected to the at least one expansion interface and the at least one transmission interface, wherein the expansion control unit communicates with the at least one external device via the at least one expansion interface and communicates with the electronic host device via the at least one transmission interface, such that the electronic host device communicates with the at least one external device via control of the expansion control unit.

2. The mobile power supply device as claimed in claim 1, wherein when the at least one external device is electrically connected to the at least one expansion interface, the charging control unit controls the battery to charge the at least one external device via the at least one expansion interface.

3. The mobile power supply device as claimed in claim 2, wherein when the at least one external device is electrically connected to the at least one expansion interface and the battery is out of electricity, the electronic host device charges the at least one external device via the at least one expansion interface.

4. The mobile power supply device as claimed in claim 3, wherein the at least one transmission interface comprises a physical transmission device and a wireless communication module, the physical transmission device being used for electrically connecting to the electronic host device, allowing the charging control unit to control the battery to charge the electronic host device via the physical transmission device; the mobile power supply device communicates with the electronic host device via the physical transmission device or the wireless communication module.

5. The mobile power supply device as claimed in claim 4, wherein the physical transmission device is a Micro Universal Serial Bus (Micro USB) and the wireless communication module is a Bluetooth communication module.

6. The mobile power supply device as claimed in claim 5, wherein the at least one expansion interface is a memory card slot, and the external device is a memory card or a memory module.

7. The mobile power supply device as claimed in claim 5, wherein the at least one expansion interface is a subscriber identity identification module card slot, and the external device is a subscriber identity identification module card (Subscriber Identity Module, SIM card).

8. The mobile power supply device as claimed in claim 5, further comprising a fingerprint sensor, wherein the at least one expansion interface is electrically connected to the fingerprint sensor.

9. The mobile power supply device as claimed in claim 1, wherein the at least one transmission interface comprises a physical transmission device and a wireless communication module, the physical transmission device being used for electrically connecting to the electronic host device, allowing the charging control unit to control the battery to charge the electronic host device via the physical transmission device; the mobile power supply device communicates to the electronic host device via the physical transmission device or the wireless communication module.

10. The mobile power supply device as claimed in claim 9, wherein the physical transmission device is a Micro Universal Serial Bus (Micro USB) and the wireless communication module is a Bluetooth communication module.

11. The mobile power supply device as claimed in claim 9, wherein the physical transmission device is a Universal Serial Bus (USB) for connecting to the electronic host device.

\* \* \* \* \*